(12) United States Patent
Kuo

(10) Patent No.: US 6,697,250 B2
(45) Date of Patent: Feb. 24, 2004

(54) LIQUID CRYSTAL DISPLAY COMPUTER WITH A REMOVABLE DEVICE FRAME

(75) Inventor: Yan-Lin Kuo, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 80 days.

(21) Appl. No.: 09/683,963

(22) Filed: Mar. 6, 2002

(65) Prior Publication Data
US 2003/0090864 A1 May 15, 2003

(30) Foreign Application Priority Data
Nov. 15, 2001 (TW) ........................................ 90128375 A

(51) Int. Cl.⁷ ................................................ H05K 7/20
(52) U.S. Cl. .......................... 361/681; 361/687; 349/58; 312/223.2
(58) Field of Search .................................. 361/679–687, 361/724–727, 690–695; 312/223.1–223.6; 248/917–924; 349/58; 415/213.1, 214.1; 454/184

(56) References Cited

U.S. PATENT DOCUMENTS

| 6,219,228 B1 | * | 4/2001 | Sun | 361/683 |
| 6,430,037 B1 | * | 8/2002 | Oba et al. | 361/680 |
| 6,563,705 B1 | * | 5/2003 | Kuo | 361/687 |

* cited by examiner

Primary Examiner—Hung Van Duong
(74) Attorney, Agent, or Firm—Winston Hsu

(57) ABSTRACT

A desktop computer has a base, a front case, a display panel, a motherboard, a device frame, and a rear case. The front case has a front panel, an upper panel and a lower panel. The display panel is positioned on the front side of the front panel and electrically connected to the motherboard positioned on the rear side of the front panel. The device frame is employed to fix a peripheral device electrically connected to the motherboard. The upper side and the lower side of the device frame are respectively in contact with the inner sides of the upper panel and the lower panel of the front case to form a supporting frame on the rear side of the front case. The rear case is positioned on the rear side of the front case and employed to cover the motherboard and the device frame.

12 Claims, 8 Drawing Sheets

LIQUID CRYSTAL DISPLAY COMPUTER WITH A REMOVABLE DEVICE FRAME

BACKGROUND OF INVENTION

1. Field of the Invention

The present invention relates to a liquid crystal display (LCD) desktop computer, and more specifically, to a LCD desktop computer with a removable device frame.

2. Description of the Prior Art

A conventional personal computer comprises various components. Typically, each component is separated from another, causing the computer to be heavy and bulky for the user. Therefore, a highly portable liquid crystal display (LCD) desktop computer was introduced. The LCD desktop computer combines a base and a housing. Components such as a motherboard, disk drives, and a power supply are located inside the housing. The LCD desktop computer substitutes an LCD panel for a conventional cathode ray tube (CRT) monitor, so as to efficiently save space occupied by the desktop computer.

As technology progresses, more and more people tend to heavily rely on a computer to handle and store numerous kinds of information. Therefore, a hard disk drive (HDD) of the computer is frequently replaced in order to upgrade the computer when storage space of the computer is no longer enough for the user. However, the HDD of either a conventional desktop computer or an LCD desktop computer is fixed inside the case by screws. The user needs to spend considerable time using a screwdriver to either remove the HDD from the computer or install a new HDD in the computer. In addition, the screws are easily lost and the screw threads may be damaged during the maintenance and the upgrading of the computer, leading to a lengthy amount of maintenance time.

SUMMARY OF INVENTION

It is therefore a primary objective of the claimed invention to provide a liquid crystal display (LCD) computer with a removable device frame so as to save efforts on maintenance of the computer.

According to the claimed invention, a desktop computer comprises a base, a front case, a display panel, a motherboard, a device frame, and a rear case. The base is employed to support the desktop computer on a desk, and the front case has a bottom pivotally installed on the base. The front case comprises a front panel facing a user, an upper panel horizontally positioned on an upper-rear end of the front panel, and a lower panel horizontally positioned on a lower-rear end of the front panel. The front panel, upper panel, and the lower panel form a recess with an opening facing a rear side of the front panel. The display panel is vertically installed on a front side of the front panel for displaying an image to the user. The motherboard is vertically installed on the rear side of the front panel, positioned between the upper panel and the lower panel, and is electrically connected to the display panel. The motherboard comprises a central processing unit (CPU) and at least a memory module installed on the motherboard for controlling operations of the desktop computer. The device frame, employed to fix a computer peripheral device electrically connected to the motherboard via a cable, comprises two latches respectively installed on an upper side and a lower side of the device frame. The upper panel and the lower panel of the front case also comprise two corresponding latch receiving devices. The two latches are capable of latching with the two latch receiving devices to respectively fix the upper side and the lower side of the device frame on the rear of the upper panel and the lower panel of the front case. The upper side and the lower side of the device frame are in contact with inner sides of the upper panel and the lower panel of the front case to form a supporting frame on the rear side of the front case to support the front case. The rear case is installed on the rear side of the front case to cover the motherboard and the device frame positioned on the rear side of the front case.

It is an advantage of the claimed invention over the prior art that the device frame of the desktop computer provided in the claimed invention utilizes the two latches respectively installed on an upper side and a lower side of the device frame. The latches are used to latch with the two corresponding latch receiving devices on the upper panel and the lower panel of the front case, respectively fixing the upper side and the lower side of the device frame on the rear of the upper panel and the lower panel of the front case. The upper side and the lower side of the device frame are thus in contact with inner sides of the upper panel and the lower panel of the front case to form a supporting frame on the rear side of the front case to support the front case. In addition, the device frame is removable from the rear side of the front case. By pushing the elastic latch on the upper side of the device frame, the user can easily make the upper side of the device frame separate from the upper panel of the front case. Therefore, the efforts and the time spent on either the maintenance or the upgrading of the desktop computer are significantly reduced due to the screwless design of the device frame.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
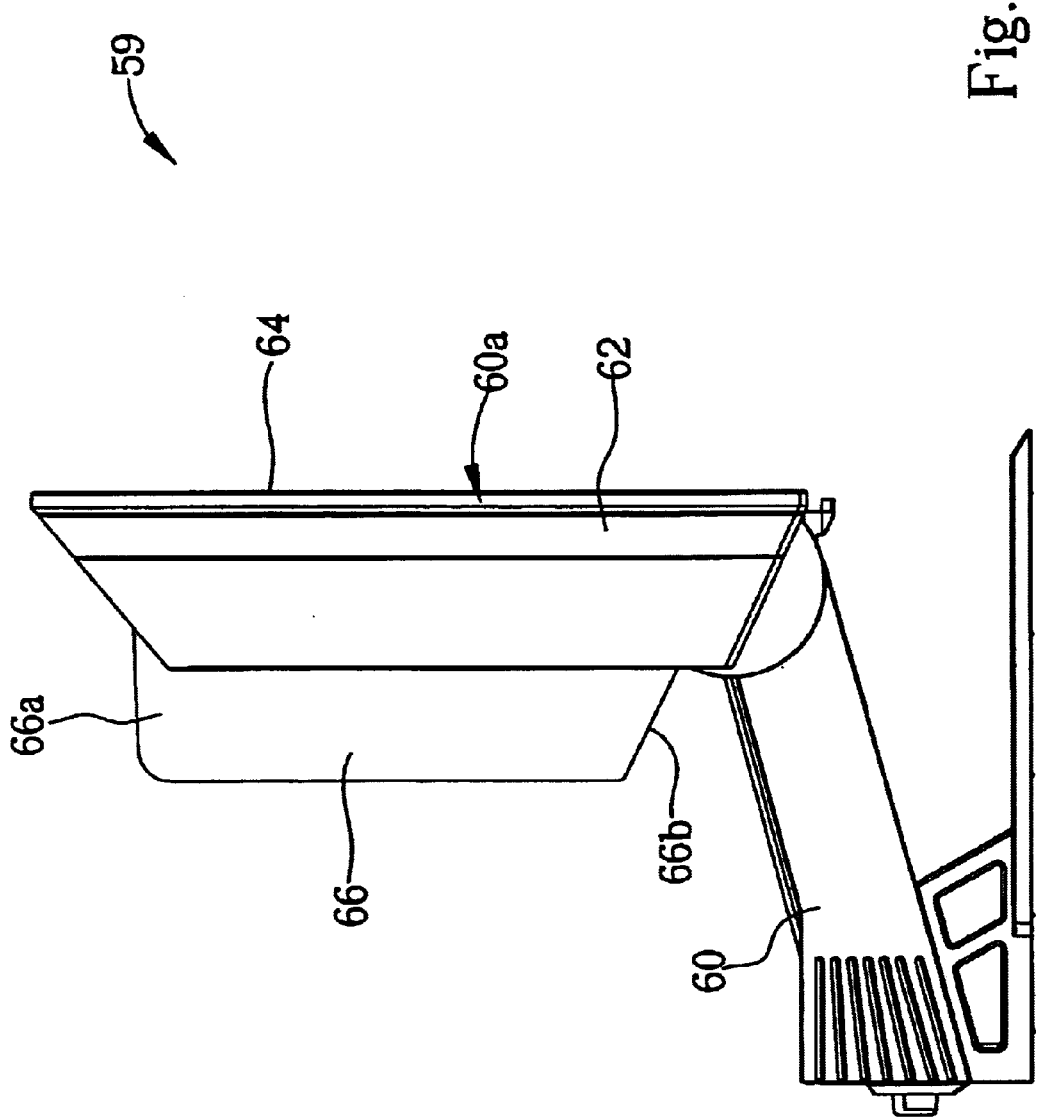
FIG. 1 is a side view of an LCD desktop computer according to the present invention.
Figure 2:
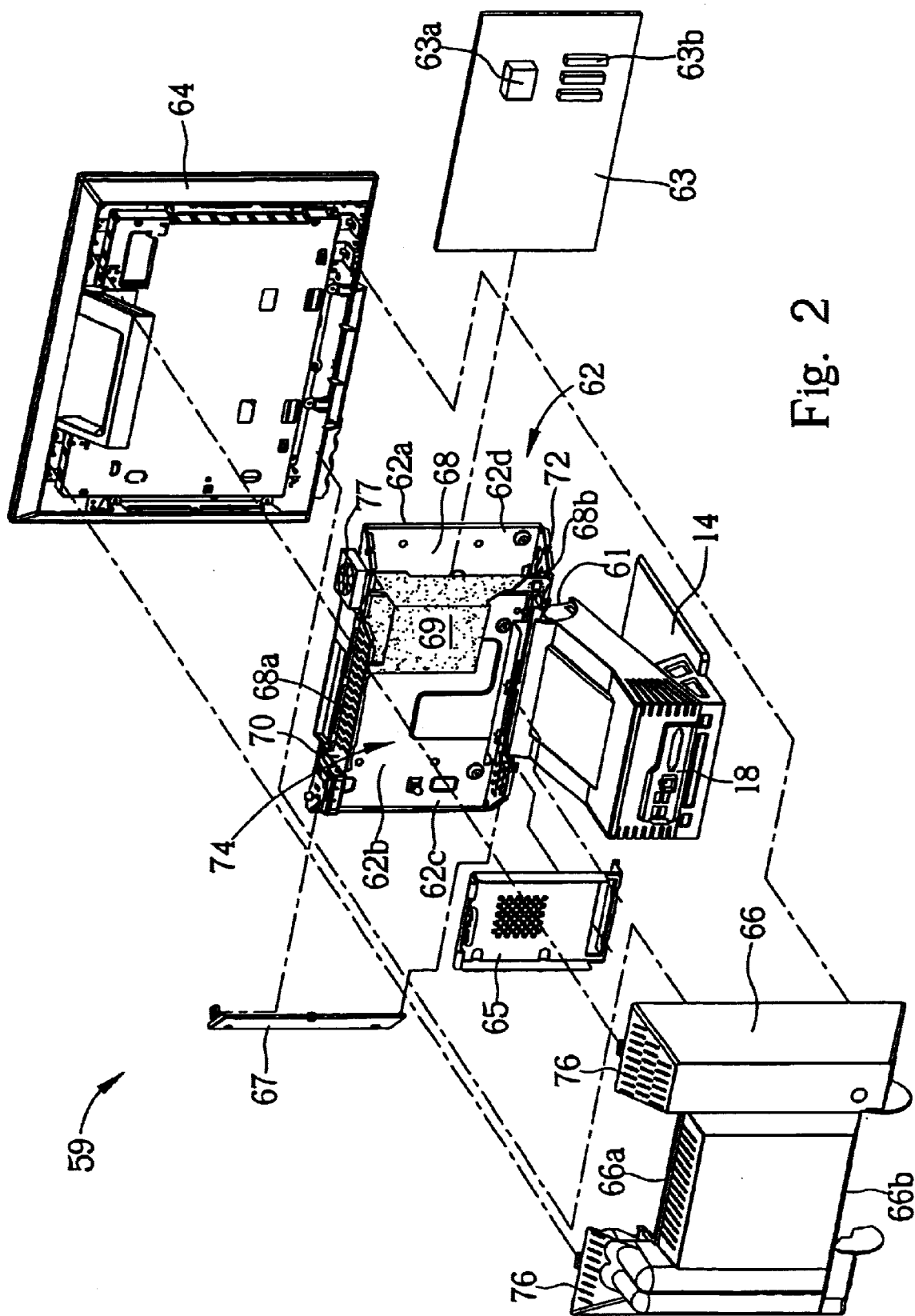
FIG. 2 is an exploded view of the LCD desktop computer according to the present invention.

Please refer to FIG. 1 and FIG. 2, which respectively represent a side view and an exploded view of a liquid crystal display desktop computer (LCD desktop computer) 59 according to the present invention. As shown in FIG. 1 and FIG. 2, the LCD desktop computer 59 comprises a base 60, a front case 62 with a bottom pivotally installed on the base 60, a fan 77, a liquid crystal display panel (LCD panel) 64, a motherboard 63, a device frame 65, a supporting panel 67, a power supply 69, and a rear case 66. The base 60 comprises a slot facing a front side 60a of the base 60 for installing a compact disc drive (CD drive) 61, and is employed to support the LCD desktop computer 59 on a desk. The front case 62 comprises a front panel 68 facing a user on a front side 62a of the front case 62, an upper panel 70 horizontally positioned on an upper-rear end 68a of the front panel 68, and a lower panel 72 horizontally positioned on a lower-rear end 68b of the front panel 68. The front panel 68, upper panel 70, and the lower panel 72 form a recess 74 with an opening facing a rear side 62b of the front case 62. The LCD panel 64 is vertically installed on the front side 62a of the front panel 68 for displaying an image to the user, and a width of the LCD panel 64 is greater than a height of the LCD panel 64. The motherboard 63 is vertically installed on the rear side 62b of the front panel 68 and positioned between the upper panel 70 and the lower panel 72. As well, a width of the motherboard 63 is greater than a height of the motherboard 63. The motherboard 63 is electrically connected to the LCD panel 64 and comprises a central processing unit (CPU) 63a and at least a memory module 63b installed on the motherboard 63 for controlling operations of the desktop computer 59. The device frame 65 is employed to fix a computer peripheral device (not shown) electrically connected to the motherboard 63 via a cable. In the preferred embodiment of the present invention, the computer peripheral device is a hard disc drive (HDD). The power supply 69 is electrically connected to the motherboard 63 for supplying electricity to the motherboard 63. The rear case 66 is installed on the rear side 62b of the front case 62 to cover the motherboard 63 and the device frame 65 positioned on the rear side 62b of the front case 62. In addition, a plurality of vent holes 76 are positioned on an upper side 66a and a lower side 66b of the rear case 66 to dissipate the heat generated by the motherboard 63 and the CPU 63a installed in the recess 74 of the front case 62. In order to reinforce the dissipation of the heat, the front case 62 further comprises the fan 77 installed adjacent to the vent holes 76 of the upper panel 70 of the front case 62 to upwardly drive the heat from the recess 74 and out the rear case 66.

Figure 3:
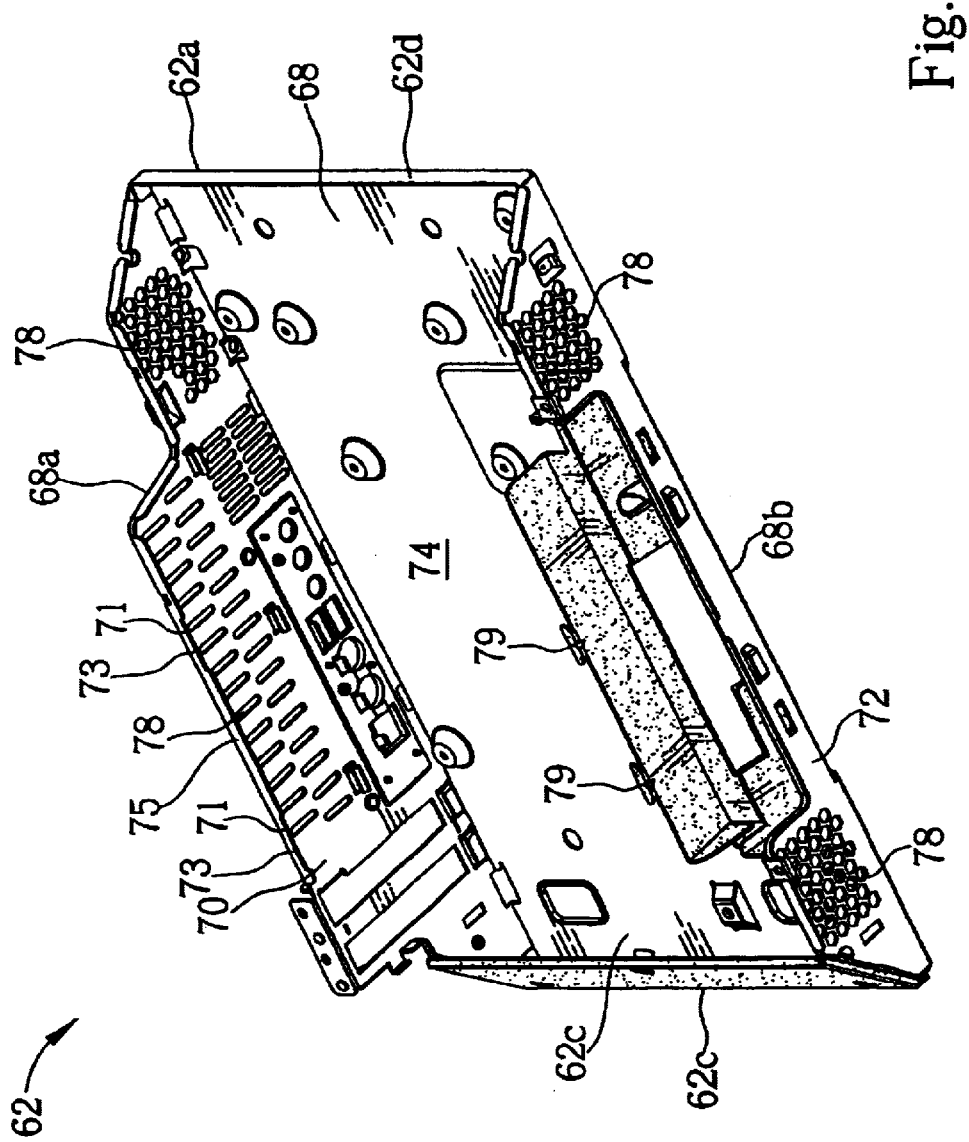
FIG. 3 is a magnified view of a front case according to the present invention.
Figure 4:
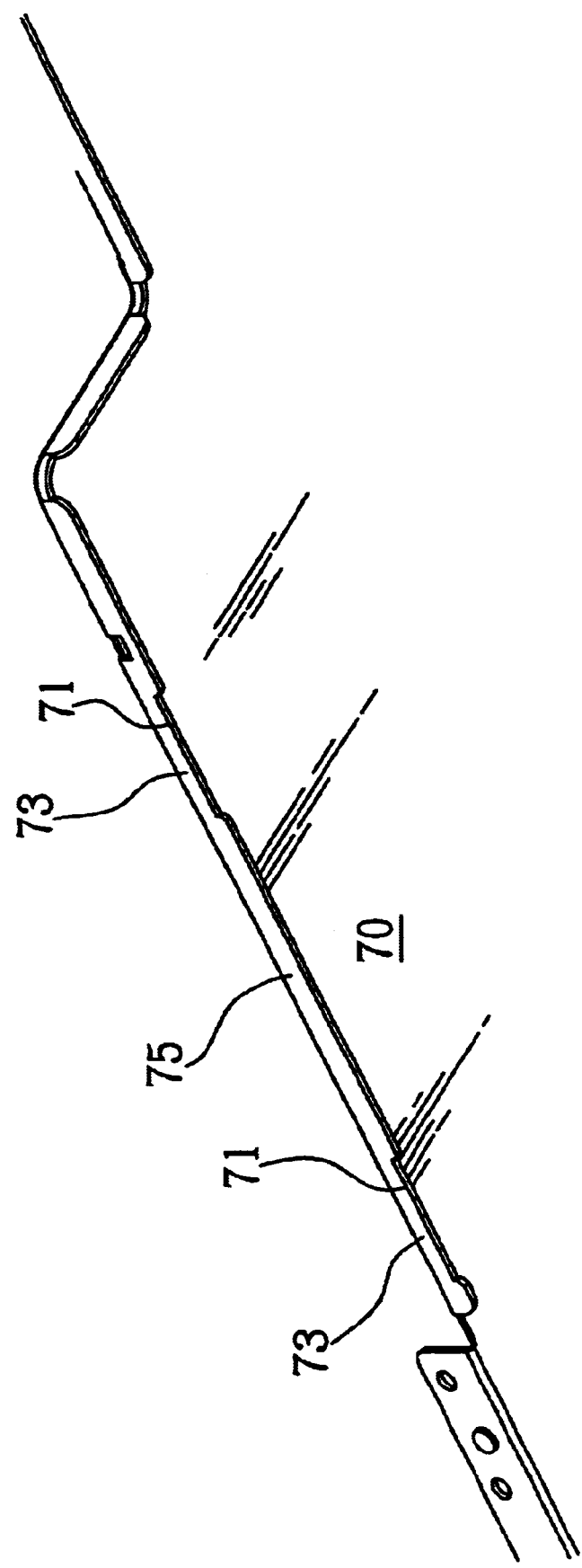
FIG. 4 is a locally magnified view of an edge of an upper panel of the front case according to the present invention.
Figure 7:
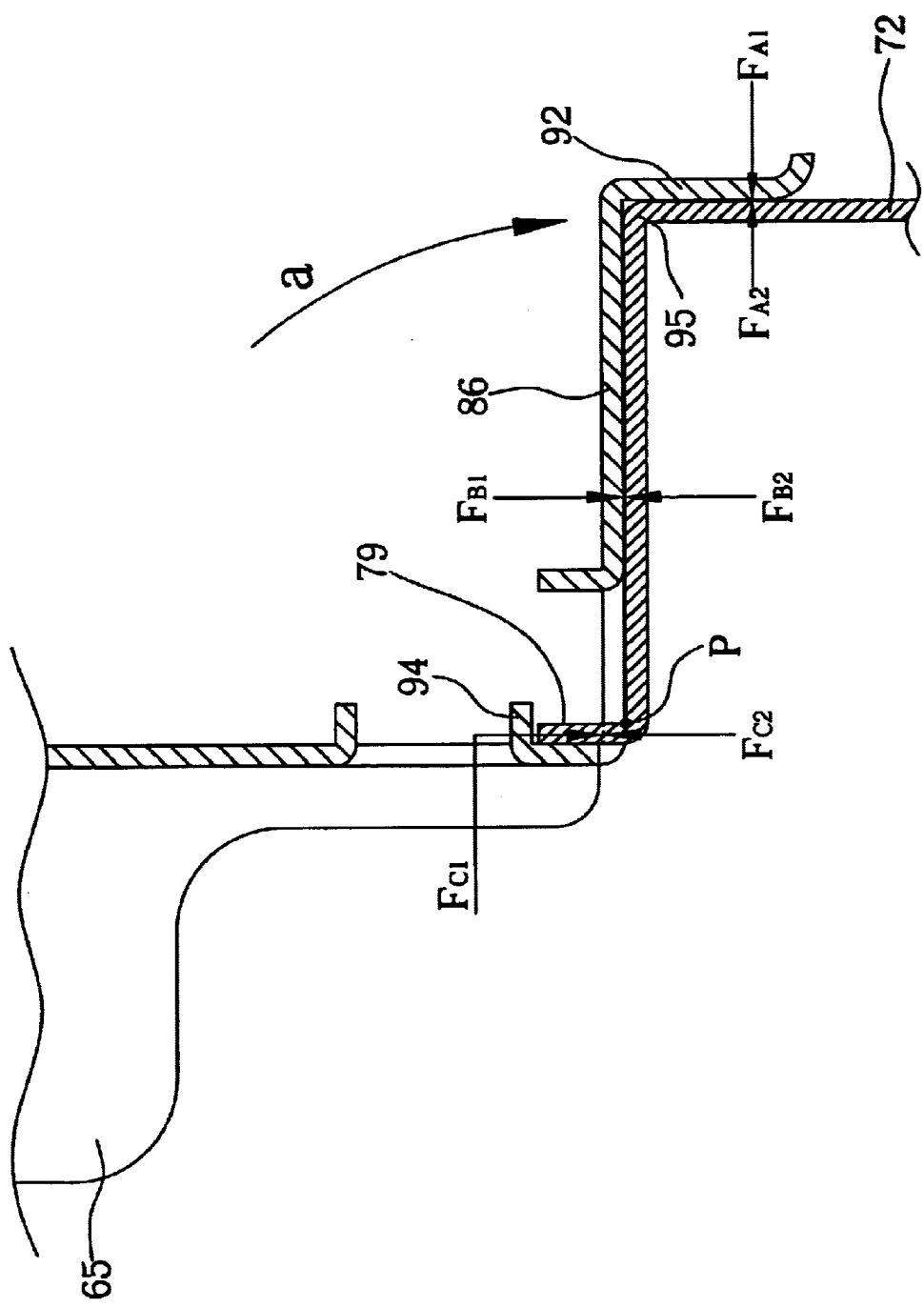
FIG. 7 is a local side view of a lower side of the device frame as the device frame is installed between inner sides of the upper panel and a lower panel of the front case.

Please refer to FIG. 3 and FIG. 4, which respectively represent a magnified view of the front case 62 and a locally magnified view of an edge of the upper panel 70 of the front case 62 according to the present invention. As shown in FIG. 3 and FIG. 4, a width of the front panel 68 of the front case 62 is greater than a height of the front panel 68 of the front case 62. The edge of the upper panel 70 of the front case 62 comprises a plurality of receiving recesses 71, portions of the edge of the upper panel 70 adjacent to the recesses 71 comprise a plurality of position-fixing latch receiving devices 73, and the central portion of the edge of the upper panel 70 of the front case 62 comprises an upper latch receiving device 75. An edge of the lower panel 72 of the front case 62 comprises a plurality of position-fixing receiving devices 79. A side edge of the lower panel 72 adjacent to the front panel 68 is employed as a lower latch receiving device 95, which is not shown in FIG. 3 but is shown in FIG. 7. The position-fixing latch receiving devices 73, upper latch receiving device 75, position-fixing receiving devices 79, and lower latch receiving device 95 interact with the device frame 65 to respectively fix an upper side 65a and a lower side 65b of the device frame 65 on the rear of the upper panel 70 and the lower panel 72 of the front case. Therefore, the upper side 65a and the lower side 65b of the device frame 65 are in contact with inner sides of the upper panel 70 and the lower panel 72 of the front case 62 to form a supporting frame on the rear side of the front case 62 to support the front case 62. A plurality of vent holes 78 are positioned on the upper panel 70 and the lower panel 72 of the recess 74 of the front panel 62 to dissipate the heat generated by the motherboard 63 and the CPU 63a installed in the recess 74 of the front case 62.

Figure 5:
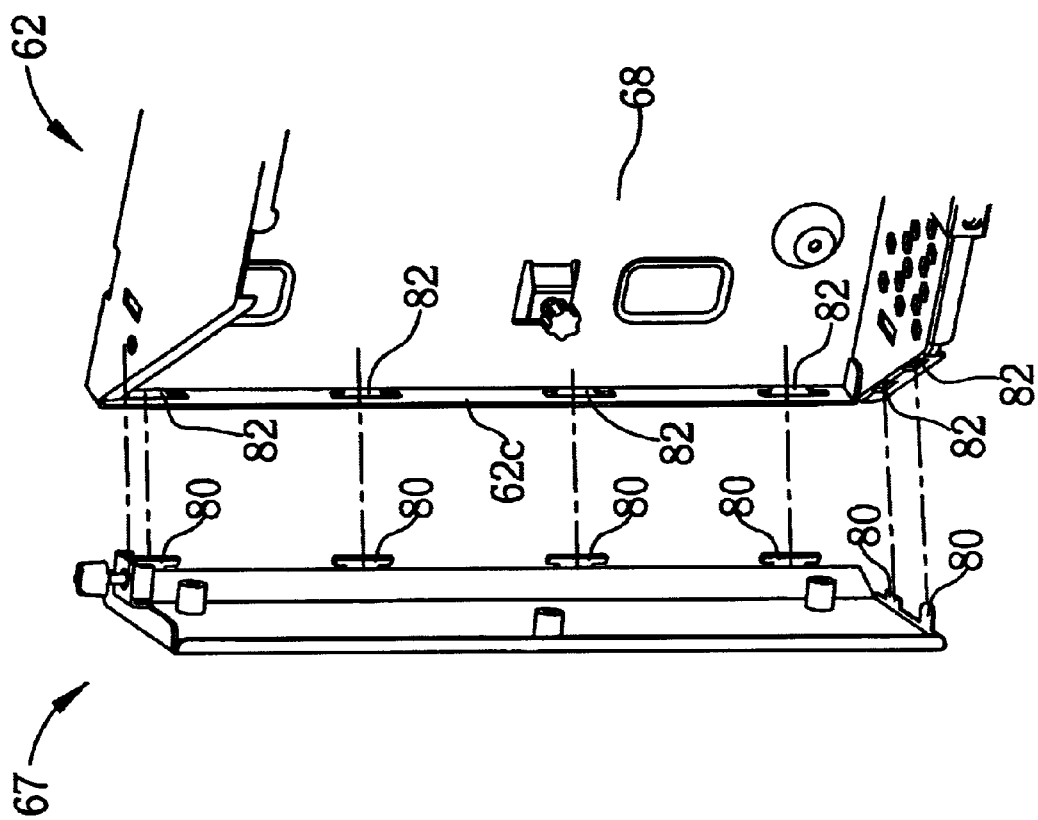
FIG. 5 is a magnified view of a supporting panel according to the present invention.

Please refer to FIG. 5 of a magnified view of a supporting panel 67 according to the present invention. As shown in FIG. 5, the supporting panel 67 is vertically installed either on a left-rear side 62c or a right-rear side 62d of the front case 62. An edge of the supporting panel 67 comprises a plurality of latches 80, and the front panel 68 and the lower panel 72 of the front case 62 also comprise a plurality of corresponding latch receiving devices 82. The latches 80 interact with the latch receiving devices 82 to fix the supporting panel 67 either on the left-rear side 62c or the right-rear side 62d of the front panel 68, upper panel 70, and the lower panel 72 of the front case 61 to form a supporting frame either on the left-rear side 62c or the right-rear side 62d of the front case 62.

Figure 6:
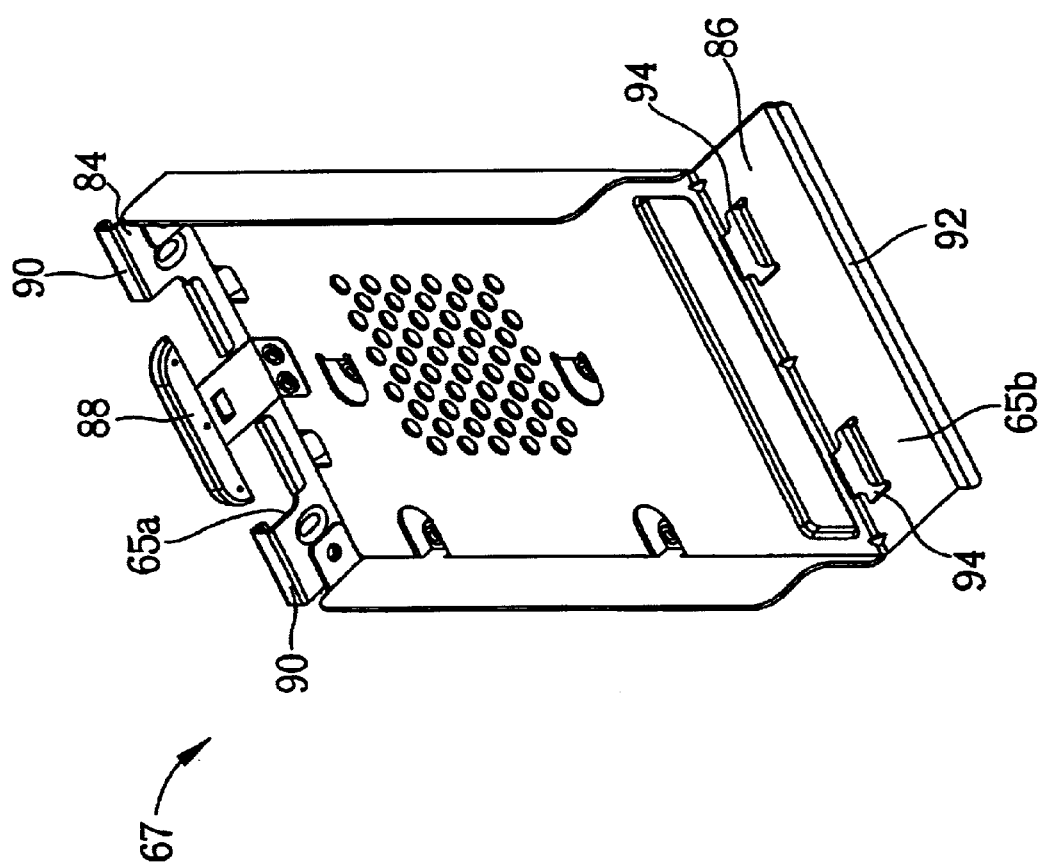
FIG. 6 is a magnified view of a device frame according to the present invention.

Please refer to FIG. 6 of a magnified view of the device frame 65 according to the present invention. As shown in FIG. 6, the device frame 65 comprises an upper panel 84 and a lower panel 86 respectively positioned on an upper side 65a and a lower side 65b of the device frame 65. The device frame 65 further comprises an upper latch 88 and a plurality of position-fixing latches 90 on the upper side 65a of the device frame 65, and a lower latch 92 and a plurality of position-fixing devices 94 on a lower panel 86 of the device frame 65. The upper latch 88, position-fixing latches 90, and the lower latch 92 of the device frame 65 respectively interact with the upper latch receiving device 75, the position-fixing latch receiving devices 73 of the upper panel 70, and the lower latch receiving device 95 (not shown in FIG. 6 but in FIG. 7) of the lower panel 72 to respectively fix the upper side 65a and the lower side 65b of the device frame 65 on the upper latch receiving device 75 and the position-fixing latch receiving devices 73 of the upper panel 70, and the lower latch receiving device 95. Therefore, the upper panel 84 and the lower panel 86 of the device frame 65 are respectively in contact with the inner sides of the upper panel 70 and the lower panel 72 of the front case 62 to upwardly support the upper panel 70 of the front case 62 and downwardly support the lower panel 72 of the front case 62, forming a rear supporting frame of the front case 62.

Please refer to FIG. 7 of a local side view of the lower side 65b of the device frame 65 as the device frame 65 is installed between the inner sides of the upper panel 70 and the lower panel 72 of the front case 62. As shown in FIG. 7, the lower latch 92 and the position-fixing device 94 of the device frame 65 are respectively fixed on the lower latch receiving device 95 and the position-fixing receiving devices 79 of the lower panel 72 of the front case 62 by using point P as a fulcrum for the lower latch 92 to rotate along direction a so as to make the lower latch 92 in contact with the lower latch receiving device 95. The lower latch 92 and the position-fixing device 94 positioned on the lower panel 86 of the device frame 65 respectively interact with the lower latch receiving device 95 and the position-fixing receiving device 79 of the lower panel 72 of the front case 62, launching forces $F_{A1}$, $F_{B1}$, and $F_{C1}$ on the lower panel 72, and the lower panel 72 launches counter forces $F_{A2}$, $F_{B2}$, and $F_{C2}$ on the device frame 65. Therefore, left-to-right or front-to-rear moving of the lower side 65b of the device frame 65 is prevented.

Figure 8:
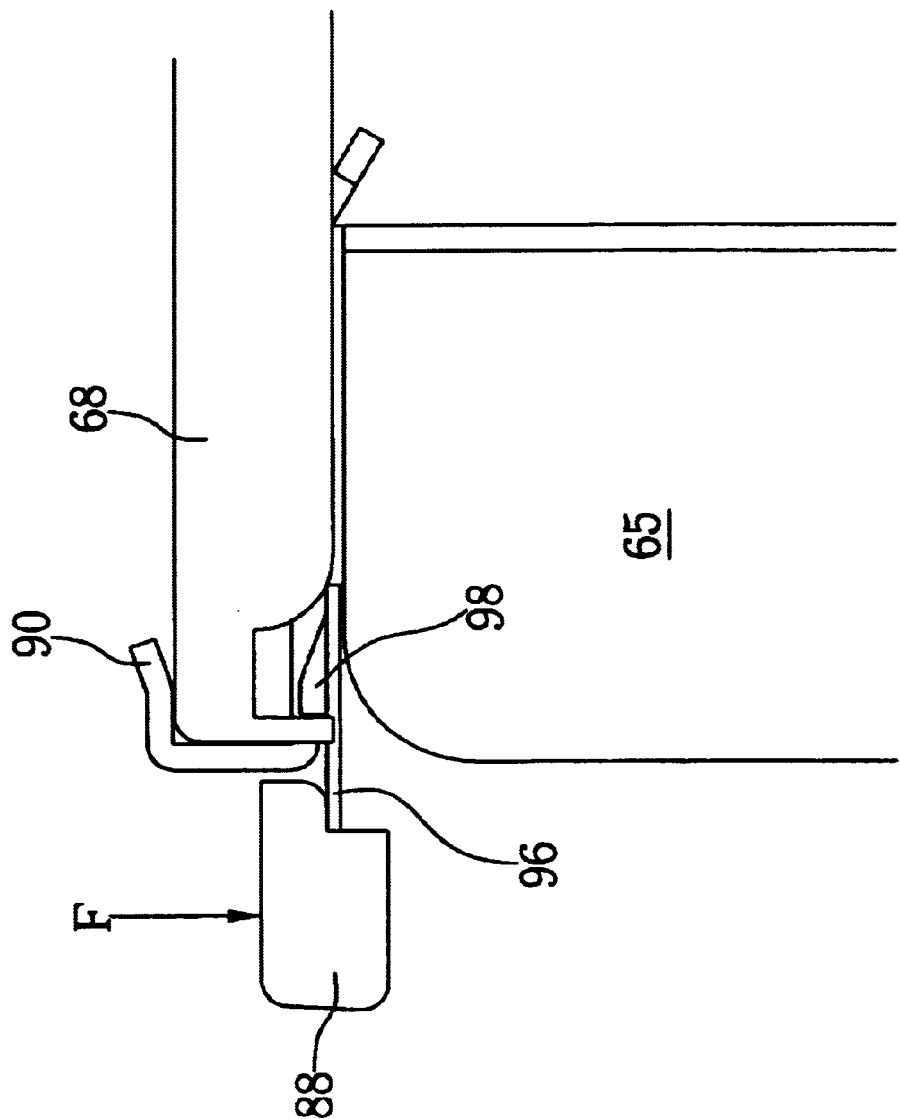
FIG. 8 is a local side view of an upper side of the device frame as the device frame is installed between the inner sides of the upper panel and the lower panel of the front case.

Please refer to FIG. 8 of a local side view of the upper side 65a of the device frame 65 as the device frame 65 is installed between the inner sides of the upper panel 70 and the lower panel 72 of the front case 62. As shown in FIG. 8, the upper latch 88 comprises a spring arm 96, and the spring arm 96 comprises a spring latch 98. As the device frame 65 is installed between the inner sides of the upper panel 70 and the lower panel 72 of the front case 62, the position-fixing latch 90 latches the position-fixing latch receiving device 73 shown in FIG. 4, and the spring latch 98 touches a rear side of the upper latch receiving device 75 shown in FIG. 4. Since a width of the position-fixing latch 90 is equal to a width of the recess shown in FIG. 4, the left-to-right or front-to-rear moving of the upper side 65a of the device frame 65 is prevented. In addition, the device frame 65 is removable from the rear side 62b of the front case 62 since the upper latch 88 is an elastic latch. By pushing the upper latch 88 of the device frame 65 with an external force F, the user can easily make the upper side 65a of the device frame 65 separate from the upper panel 70 of the front case 62.

In comparison with the desktop computer according to the prior art, the LCD desktop computer 59 employs the removable device frame 65 to fix a computer peripheral device, such as a HDD. The upper latch 88, position-fixing latches 90, and the lower latch 92 of the device frame 65 respectively interact with the upper latch receiving device 75, the position-fixing latch receiving devices 73 of the upper panel 70, and the lower latch receiving device 95 of the lower panel 72 on the rear side 62b of the front case 62 to respectively fix the upper side 65a and the lower side 65b of the device frame 65 on the upper latch receiving device 75, the position-fixing latch receiving devices 73 of the upper panel 70, and the lower latch receiving device 95. Simultaneously, the lower latch 92 and the position-fixing device 94 positioned on the lower panel 86 of the device frame 65 respectively interact with the lower latch receiving device 95 and the position-fixing receiving device 79 of the lower panel 72 of the front case 62, preventing the left-to-right or front-to-rear moving of the lower side 65b of the device frame 65. In addition, the device frame 65 is removable from the rear side 62b of the front case 62. By pushing the upper latch 88 of the device frame 65, the user can easily make the upper side 65a of the device frame 65 separate from the upper panel 70 of the front case 62. Therefore, the efforts and the lead-time spent on either the maintenance or the upgrading of the LCD desktop computer 59 are significantly reduced due to the screwless design of the device frame 65.

In addition, as the device frame 65 is fixed on the position-fixing latch receiving devices 73, upper latch receiving device 75, position-fixing receiving devices 79, and lower latch receiving device 95, the upper panel 84 and the lower panel 86 of the device frame 65 are respectively in contact with the inner sides of the upper panel 70 and the lower panel 72 of the front case 62 to upwardly support the upper panel 70 of the front case 62 and downwardly support the lower panel 72 of the front case 62, forming a rear supporting frame of the front case 62. Simultaneously, the latches 80 of the supporting panel 67 interact with the latch receiving devices 82 to fix the supporting panel 67 either on the left-rear side 62c or the right-rear side 62d of the front panel 68, upper panel 70, and the lower panel 72 of the front case 61 to form a supporting frame either on the left-rear side 62c or the right-rear side 62d of the front case 62. Consequently, the structural reliability of the LCD desktop computer 59 is significantly improved.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A desktop computer comprising:

a base for supporting the desktop computer on a desk;

a front case with a bottom pivotally installed on the base, the front case comprising a front panel facing a user, an upper panel horizontally positioned on an upper-rear end of the front panel, and a lower panel horizontally positioned on a lower-rear end of the front panel, the front panel, upper panel and the lower panel forming a recess with an opening facing a rear side of the front case;

a display panel vertically installed on a front side of the front panel for displaying an image to the user;

a motherboard vertically installed on the rear side of the front panel and positioned between the upper panel and the lower panel, the motherboard being electrically connected to the display panel and comprising a central processing unit (CPU) and at least a memory module installed on the motherboard for controlling operations of the desktop computer;

a device frame for fixing a computer peripheral device, the computer peripheral device being electrically connected to the motherboard via a cable, the device frame comprising two latches respectively installed on an upper side and a lower side of the device frame, the upper panel and the lower panel of the front case also comprising two corresponding latch receiving devices, the two latches being capable of latching with the two latch receiving devices so as to respectively fix the upper side and the lower side of the device frame on the rear of the upper panel and the lower panel of the front case, the upper side and the lower side of the device frame being in contact with inner sides of the upper panel and the lower panel of the front case to form a supporting frame on the rear side of the front case to support the front case; and a rear case installed on the rear side of the front case to cover the motherboard and the device frame positioned on the rear side of the front case.

2. The desktop computer of claim 1 wherein the device frame comprises an upper panel and a lower panel respectively positioned on the upper side and the lower side of the device frame, and when the device frame is installed between the upper panel and the lower panel of the front case, the upper panel and the lower panel of the device frame are respectively in contact with the inner sides of the upper panel and the lower panel of the front case to upwardly support the upper panel of the front case and downwardly support the lower panel of the front case.

3. The desktop computer of claim 1 wherein the latch on the upper side of the device frame is an elastic latch, the device frame being removable from the rear side of the front case for the user by using fingers to push the elastic latch so as to make the upper side of the device frame separate from the upper panel of the front case.

4. The desktop computer of claim 1 wherein the computer peripheral device affixed to the device frame is a hard disc drive (HDD).

5. The desktop computer of claim 1 further comprising a supporting panel vertically installed either on the left-rear side or the right-rear side of the front case, an edge of the supporting panel comprising a plurality of latches employed to fix the supporting panel either on the left-rear side or the right-rear side of the front panel, upper panel and the lower panel of the front case to form a supporting frame either on the left-rear side or the right-rear side of the front case.

6. The desktop computer of claim 1 further comprising a power supply electrically connected to the motherboard for applying electricity to the motherboard.

7. The desktop computer of claim 1 wherein the base comprises a slot facing the front side of the front case for installing a compact disc drive (CD drive).

8. The desktop computer of claim 1 wherein the display panel is a liquid crystal display panel (LCD panel).

9. The desktop computer of claim 1 wherein a width of the display panel is greater than a height of the display panel, a width of the motherboard is greater than a height of the motherboard, and a width of the front panel of the front case is greater than a height of the front panel of the front case.

10. The desktop computer of claim 1 wherein the upper panel and the lower panel of the front case comprise a plurality of vent holes, and the upper side and the lower side of the rear case comprise a plurality of vent holes, the vent holes being employed to dissipate the heat generated by the motherboard and the CPU installed in the recess of the front case.

11. The desktop computer of claim 2 wherein the lower panel of the device frame comprising a position-fixing device, and the lower panel of the front case also comprises a corresponding position-fixing device, and when the latch on the lower side of the device frame latches with the latch receiving device on the lower panel of the front case, the latch and the position-fixing device on the lower panel of the device frame interact with the latch receiving device and the position-fixing device on the lower panel of the front case so as to prevent the lower side of the device frame from moving left-to-right, or front-to-rear.

12. The desktop computer of claim 10 wherein a fan is installed adjacent to the vent holes of the upper panel of the front case to upwardly drive the heat from the recess and the rear case.

* * * * *